(12) United States Patent
Viens et al.

(10) Patent No.: US 8,585,368 B2
(45) Date of Patent: Nov. 19, 2013

(54) HYBRID STRUCTURE AIRFOIL

(75) Inventors: Daniel V. Viens, Mansfield Center, CT (US); Vincent C. Nardone, South Windsor, CT (US); Peter G. Smith, Wallingford, CT (US); James R. Strife, Nebo, NC (US); Foster P. Lamm, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/331,957

(22) Filed: Dec. 20, 2011

(65) Prior Publication Data

US 2013/0039774 A1    Feb. 14, 2013

Related U.S. Application Data

(63) Continuation-in-part of application No. 12/425,133, filed on Apr. 16, 2009, now Pat. No. 8,083,489.

(51) Int. Cl.
    *B23K 5/18*    (2006.01)
(52) U.S. Cl.
    USPC ........ 416/191; 416/224; 416/226; 416/229 A; 416/241 R
(58) Field of Classification Search
    USPC .......... 416/191, 193 R, 224, 226, 229 A, 230, 416/241 R
    See application file for complete search history.

(56) References Cited

U.S. PATENT DOCUMENTS

| | | | |
|---|---|---|---|
| 3,002,717 A | 10/1961 | Pavlecka | |
| 3,060,561 A | 10/1962 | Watter | |
| 3,695,778 A | 10/1972 | Taylor | |
| 4,029,838 A | 6/1977 | Chamis et al. | |
| 4,118,147 A | 10/1978 | Ellis | |
| 4,671,470 A | 6/1987 | Jonas | |
| 4,808,485 A | 2/1989 | Prewo et al. | |
| 4,885,212 A | 12/1989 | Prewo et al. | |
| 4,911,990 A | 3/1990 | Prewo et al. | |
| 4,999,256 A | 3/1991 | Prewo et al. | |
| 5,015,116 A | 5/1991 | Nardone et al. | |
| 5,079,099 A | 1/1992 | Prewo et al. | |
| 5,295,789 A | 3/1994 | Daguet | |
| 5,366,765 A | 11/1994 | Milaniak et al. | |
| 5,370,831 A | 12/1994 | Blair et al. | |
| 5,407,326 A | 4/1995 | Lardellier | |

(Continued)

FOREIGN PATENT DOCUMENTS

WO    2010000238    1/2010

OTHER PUBLICATIONS

EP Search Report for EP10250788.6 dated May 10, 2013.

*Primary Examiner* — Michael Lebentritt

(57) ABSTRACT

A hybrid airfoil for a gas turbine engine is provided that includes a body and a panel. The body has a first side and a second side orientated opposite the first side. The first and second sides extend between a tip, a base, a leading edge and a trailing edge. The body includes a plurality of cavities disposed in the first side of the body, which cavities extend inwardly toward the second side. The cavities collectively form an opening. At least one rib is disposed between the cavities. A shelf is disposed around the opening. The panel is attached to the shelf first mounting surface and to the rib, and is sized to enclose the opening. The panel is a load bearing structure operable to transfer loads to the body and receive loads from the body.

26 Claims, 4 Drawing Sheets

(56) References Cited

U.S. PATENT DOCUMENTS

| | | |
|---|---|---|
| 5,634,771 A | 6/1997 | Howard et al. |
| 5,947,688 A | 9/1999 | Schilling et al. |
| 6,033,186 A | 3/2000 | Schilling et al. |
| 6,039,542 A | 3/2000 | Schilling et al. |
| 7,240,718 B2 | 7/2007 | Schmidt et al. |
| 7,334,997 B2 | 2/2008 | Karafillis |
| 7,828,526 B2 * | 11/2010 | Cairo et al. .................. 416/224 |
| 8,251,664 B2 * | 8/2012 | Schreiber .................... 416/191 |
| 2005/0247818 A1 | 11/2005 | Prichard et al. |
| 2005/0249601 A1 | 11/2005 | Burdgick |
| 2005/0254955 A1 | 11/2005 | Helder et al. |
| 2006/0039792 A1 | 2/2006 | Ferte et al. |
| 2007/0065291 A1 | 3/2007 | Karafillis |
| 2007/0292274 A1 | 12/2007 | Burdgick et al. |
| 2008/0253885 A1 | 10/2008 | Foose et al. |
| 2008/0253887 A1 | 10/2008 | Cairo et al. |
| 2010/0129651 A1 | 5/2010 | Schreiber |
| 2011/0070092 A1 | 3/2011 | Gerlach |

* cited by examiner

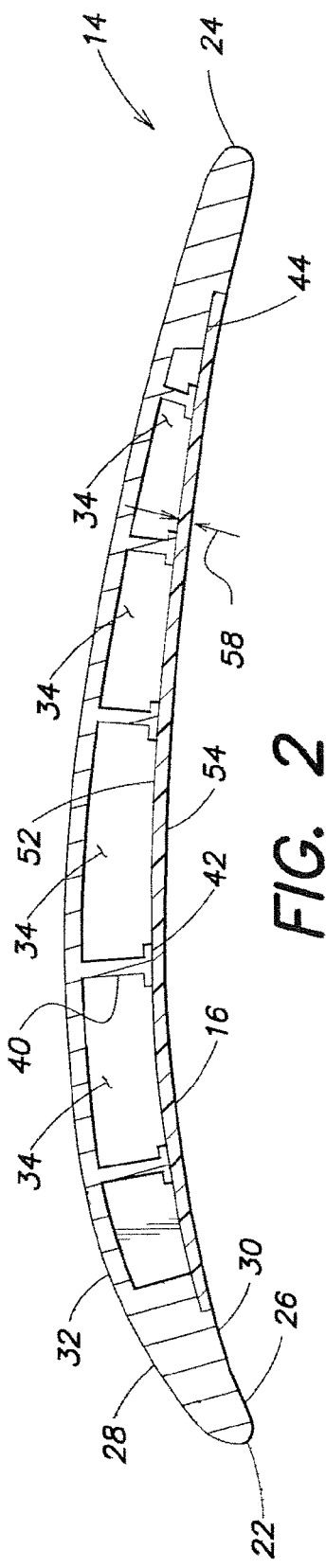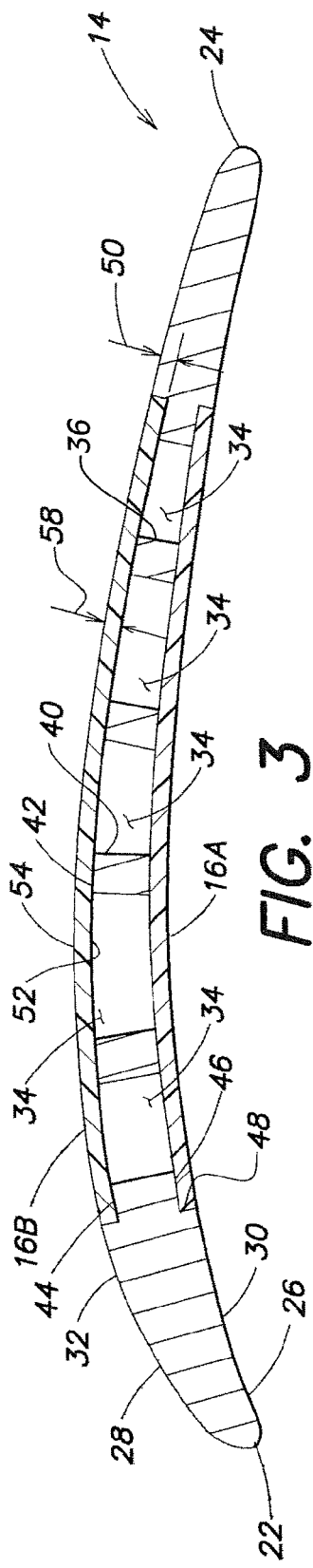

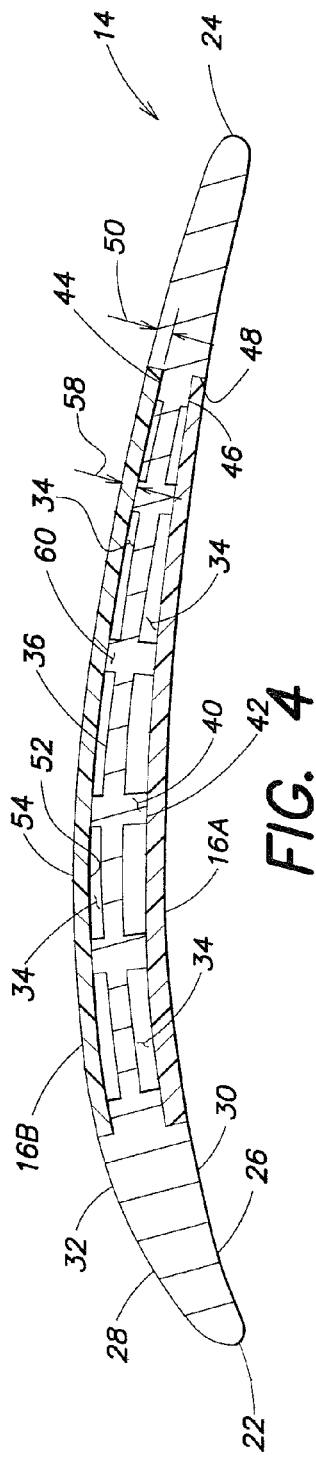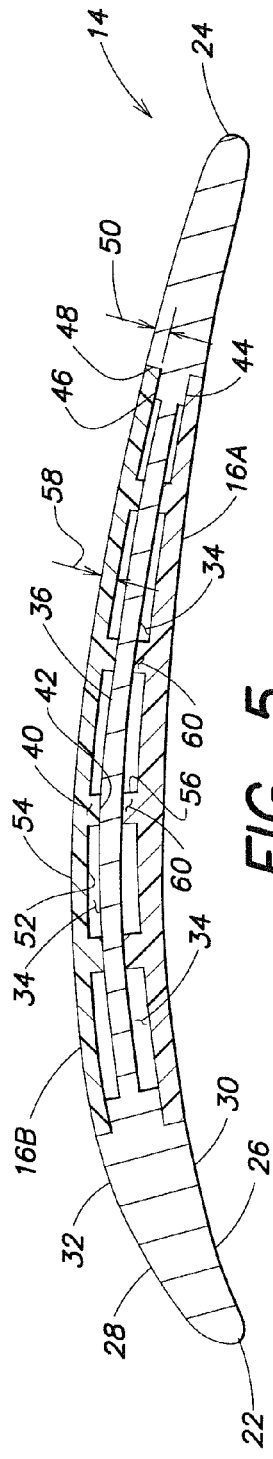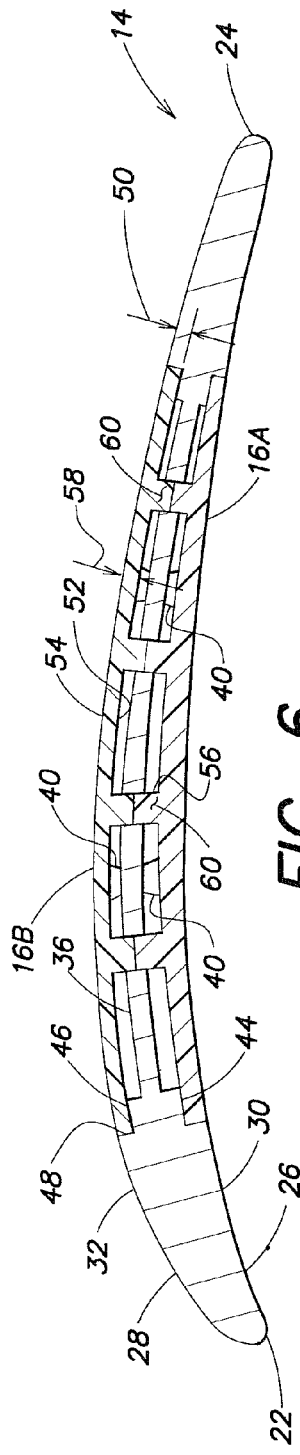

HYBRID STRUCTURE AIRFOIL

CROSS-REFERENCE TO RELATED APPLICATIONS

This application is a continuation-in-part of U.S. patent application Ser. No. 12/425,133, which is hereby incorporated by reference in its entirety.

BACKGROUND OF THE INVENTION

1. Technical Field

This disclosure relates to gas turbine engine airfoils in general, and to a hybrid airfoil utilizing composite and/or metallic materials in particular.

2. Background Information

Lightweight fan blades such as hybrid fan blades have been developed to reduce weight, centrifugal forces and inertial stress and strain in gas turbine engines. Some fan blades include a unitary hollow metallic airfoil portion formed by casting, forging and other forming techniques followed by milling to final dimensions. Other fan blades include metallic leading edge, trailing edge, and tip portion, independent of one another, fixed to a composite body. The metallic leading and trailing edges are bonded to the composite airfoil to provide erosion and impact resistance. The metallic cap is bonded to the tip of the composite airfoil to provide rubbing resistance. Both the first and the second approaches typically result in a weight reduction over a traditional titanium solid fan blade, but dramatically increase the cost of the fan blade.

Advancements in gas turbine engines have increased the need for fan blades having greater weight reductions (e.g. weight reductions of 40% or higher). Consequently, there is a need for a lightweight fan blade that is not cost prohibitive.

SUMMARY OF THE DISCLOSURE

According to an aspect of the present invention, a hybrid fan blade for a gas turbine engine is provided that includes a body and a composite panel. The body has a first side and a second side orientated opposite the first side. The first and second sides extend between a tip, a base, a leading edge and a trailing edge. The body includes a plurality of cavities disposed in the first side of the body, which cavities extend inwardly toward the second side. The cavities collectively form an opening. At least one rib is disposed between the cavities. A shelf is disposed around the opening. The composite panel is attached to the shelf first mounting surface and to the rib, and is sized to enclose the opening. The first composite panel is a load bearing structure operable to transfer loads to the body and receive loads from the body.

According to another aspect of the present invention, a hybrid fan blade for a gas turbine engine is provided that includes a body, a first composite panel, and a second composite panel. The body has a first side and a second side orientated opposite the first side. The first and second sides extend between a tip, a base, a leading edge and a trailing edge. The body includes a spar extending in a direction between the base and the tip, and extending in a direction between the leading edge and the trailing edge. The spar has a first side and a second side. The spar defines a first opening in the first side having a first shelf disposed around the first opening. The spar further defines a second opening in the second side having a second shelf disposed around the second opening The first composite panel is attached to the first shelf, and is sized to enclose the first opening. The second composite panel is attached to the second shelf, and is sized to enclose the second opening. The first and second composite panels are each load bearing structures operable to transfer loads to the body and receive loads from the body.

According to another aspect of the present invention, an airfoil (e.g., a fan blade for a gas turbine engine) is provided that includes a body formed from a metallic material, and a panel. The body extends between a first side and a second side, and includes a plurality of cavities extending from the first side toward the second side, a rib disposed between adjacent cavities, and a shelf extending around an opening in the first side formed by the cavities. The shelf has a shelf mounting surface, and the rib has a rib mounting surface disposed at a distal end thereof. The panel is attached to the shelf mounting surface and the rib mounting surface, and encloses the opening. The panel is a load bearing structure operable to transfer loads to the body and receive loads from the body.

According to another aspect of the present invention, an airfoil (e.g., a fan blade for a gas turbine engine) is provided that includes a body formed from a metallic material, a first panel and a second panel. The body extends between a first airfoil side and a second airfoil side. The body includes a spar that extends in a first direction between an airfoil base and an airfoil tip, and that extends in a second direction between an airfoil leading edge and an airfoil trailing edge. The spar forms a first opening in the first airfoil side and a first shelf extending around the first opening, and a second opening in the second airfoil side and a second shelf extending around the second opening. The first panel is attached to the first shelf, and encloses the first opening. The first panel is a load bearing structure operable to transfer loads to the body and receive loads from the body. The second panel is attached to the second shelf, and encloses the second opening. The second panel is a load bearing structure operable to transfer loads to the body and receive loads from the body.

BRIEF DESCRIPTION OF THE DRAWINGS

FIGS. 2-6 are cross-sectional diagrammatic views of embodiments of the present airfoil.

DETAILED DESCRIPTION OF THE INVENTION

Figure 1:
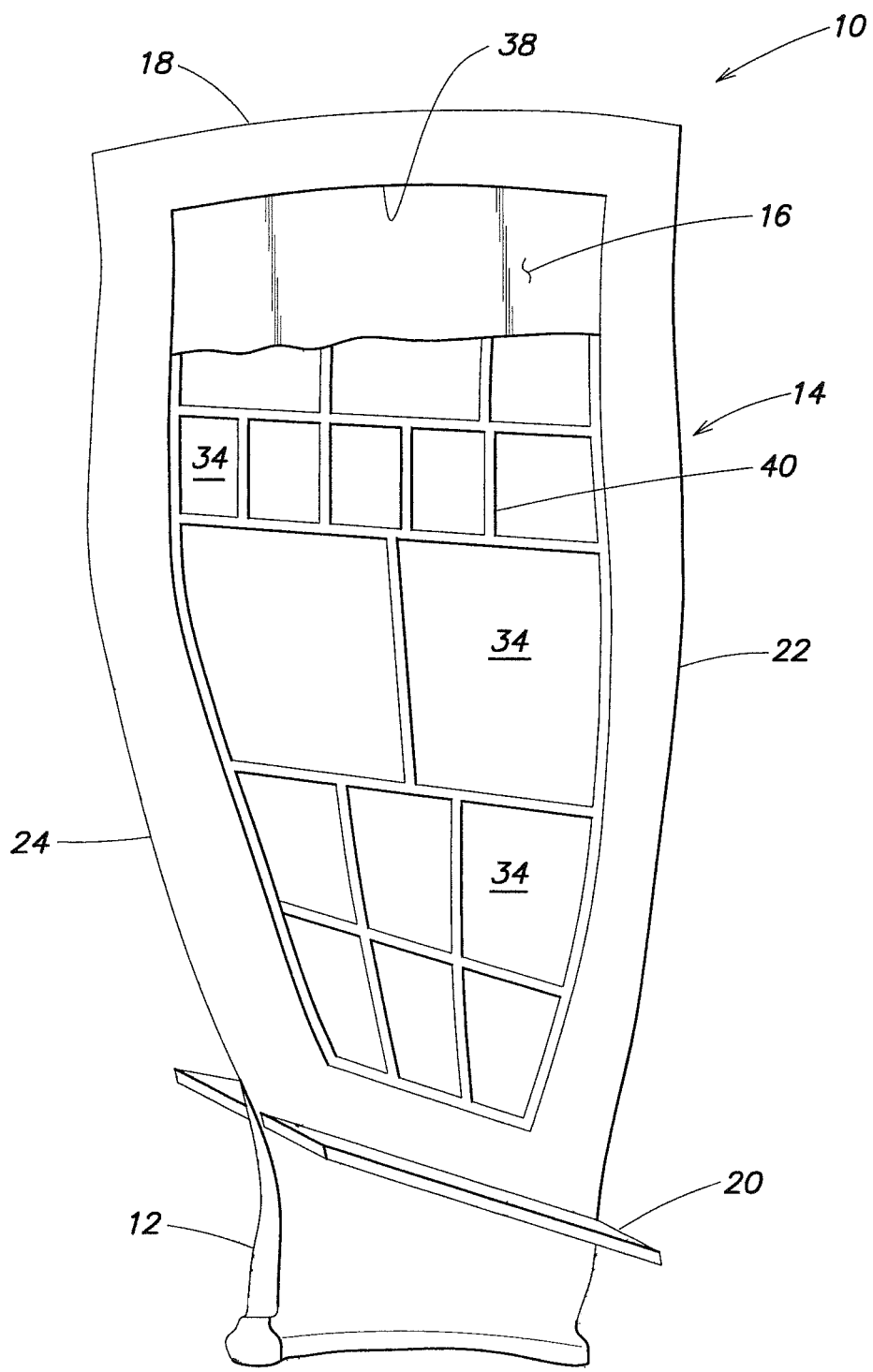
FIG. 1 is a perspective sectional diagrammatic view of the present airfoil.

Now referring to FIG. 1, a hybrid airfoil 10 (e.g., a fan blade, a compressor blade, a rotor blade, etc.) for a gas turbine engine is provided that includes a base 12, a body 14, and a composite panel 16 disposed in, and forming a part of, a side of the body 14. The base 12 includes means for attaching the airfoil 10 to a rotor hub (not shown) disposed in the engine.

The body 14 includes a tip 18, a base 20, a leading edge 22, a trailing edge 24, a first side 26 and a second side 28. The second side 28 is orientated opposite the first side 26. The first and the second sides 26, 28 extend between the tip 18, the base 20, the leading edge 22, and the trailing edge 24. The first side 26 of the body 14 has a first outer surface 30, and the second side 28 has a second outer surface 32.

At least one side 26, 28 of the body 14 includes a plurality of cavities 34, extending inwardly toward the opposite side 28, 26. In the embodiment shown in FIGS. 1 and 2, the cavities 34 are disposed in one side of the body 14 and do not extend through to the opposite side. In this embodiment, the opposite side of the body 14 continuously extends between the base 20 and the tip 18, and between the leading edge 22 and the trailing edge 24. In the embodiment shown in FIGS. 3-6, cavities 34 are disposed in both sides of the body 14, leaving a spar 36 centrally disposed within the body 14. In FIGS. 3 and 6, the cavities 34 extend through the spar 36. The body 14 can include a combination of cavities 34 disposed on a particular side that do not extend through the spar 36, and cavities 34 that do extend through the spar 36. The cavities 34 disposed in a side of the body 14 collectively form an opening 38 within that side of the body 14. The embodiments shown in FIGS. 1-3 and 6 include one or more ribs 40 disposed between adjacent cavities 34, extending outwardly. The one or more ribs 40 each include a mounting surface 42 disposed at a distal end. The rib 40 may be constant in cross-section or it may have a mounting surface 42 having a greater surface area for bonding and support purposes as will be described below.

Figure 7:
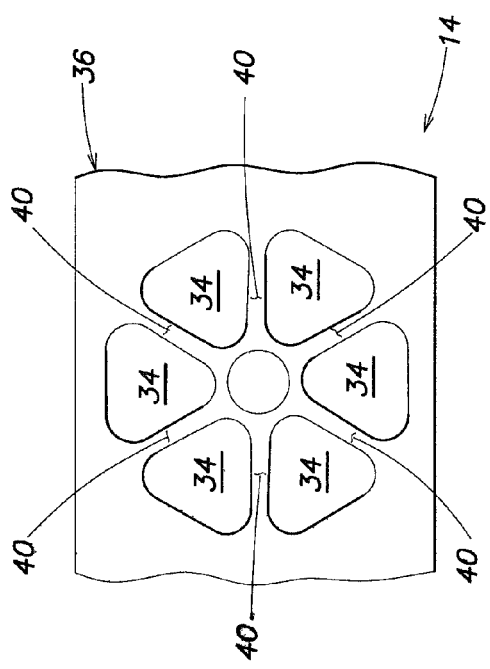
FIG. 7 is a diagrammatic illustration of a rib and cavity configuration.

The cavities 34 and ribs 40 disposed within the body 14 are selectively chosen to provide the body 14 with structural support; e.g., configurations that provide the body 14 with specific torsional and bending stiffness. For example, the airfoils 14 shown in FIGS. 4 and 6 have a webbed configuration wherein a plurality of ribs 40 extends outwardly from the spar 36. The sectional view of an body 14 shown in FIG. 7 illustrates an iso-grid configuration of cavities and ribs 40 that is an example of a particular geometric arrangement used for structural purposes. The iso-grid configuration, and other similar configurations, can be used regionally within the body 14 to provide certain mechanical characteristics in a particular area, or it can be used as a part of a repeatable pattern; e.g., a plurality of iso-grid patterns. As can be seen in FIG. 1, different cavity 34 and rib 40 configurations can be used in different regions of the body 14 to produce desired mechanical properties.

A shelf 44 is disposed around the periphery of the opening 38. The shelf 44 may be described as having portions that extend proximate the leading edge 22, the trailing edge 24, the tip 18, and the base 20. The shelf 44 includes a first mounting surface 46 that typically extends substantially parallel to the adjacent outer surface of the airfoil side, a second mounting surface 48 that extends between the first mounting surface 46 and the outer surface 30,32, and a height 50. The first mounting surface 46 of the shelf 44 and the rib mounting surface 42 are positioned to be contiguous with, and attached to, the composite panel 16. In some embodiments, the shelf 44 may form a mating configuration (e.g., male and female) with the composite panel 16, as will be discussed below.

The composite panel 16 is composed of a suitable composite material that has a density less than the material of the body 14 and one that has mechanical properties that accommodate the load expected during operation of the airfoil 10. For example, in some embodiments, the composite material is a polymer matrix composite which includes woven, braided, and/or laminated fibers operable to reinforce the composite material. The polymer matrix may be composed of materials such as, but not limited to, epoxy, polyester, bismaleimide, silicon, and/or polybenzimidazole. The fibers may be composed of materials such as, but not limited to, various types of graphite fibers, glass fibers, and/or organic fibers (e.g. Kevlar®). The composition and fiber orientation of the composite material are selected to promote low cost manufacturing (e.g. by using low cost materials and/or enabling low cost manufacturing techniques) and to tailor the composite stiffness to exhibit design dependent load bearing characteristics. Such a composite panel 16 can be made, for example, using techniques such as Resin Transfer Molding. Composite fabrication techniques and materials are generally known in the art and therefore will not be discussed in greater detail. The composite panel 16 has an inner surface 52, an outer surface 54, and an edge 56 extending between the two surfaces 52, 54. The composite panel 16 is shaped to close the opening 38 disposed in the side of the body 14. The panels 16 shown in FIGS. 2-6 have a thickness 58 adjacent the edge that is substantially equal to the height 50 of the shelf. The outer surface 54 of the panel 16 is shaped to assume the aerodynamic shape of the side 26, 28 of the body 14 to which is attached; e.g., the panel 16 can be configured as concave pressure side panel, or a convex suction side panel, and may have a radial twist component depending upon the geometry of the body 14.

Figure 8:
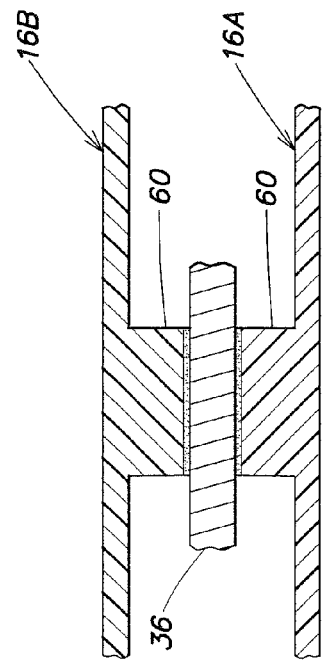
FIG. 8 is cross-sectional diagrammatic partial view of a joint between composite panels and an airfoil spar.

In some embodiments, the panel 16 has a uniform thickness 58. In other embodiments, features 60 (ribs, pads, etc.) extend outwardly from the inner surface 52 of the panel to provide the panel 16 with additional mechanical properties such as stiffness, or for attachment purposes, etc. The composite panels 16A, 16B shown in FIGS. 5 and 6, for example, includes a plurality of features 60 (e.g., ribs) that extend outwardly and contact the spar 36. FIG. 8 illustrates an example wherein the features 60 contact and are bonded to the spar 36. The composite panels shown in FIGS. 5 and 6 include aligned features 60 that extend toward one another, through cavities 34 within the spar 36, and are bonded together. The composite panel features 60 shown in FIGS. 5, 6, and 8 are examples provided to illustrate embodiments of the present invention, and the present invention is not limited to these examples.

Figure 9:
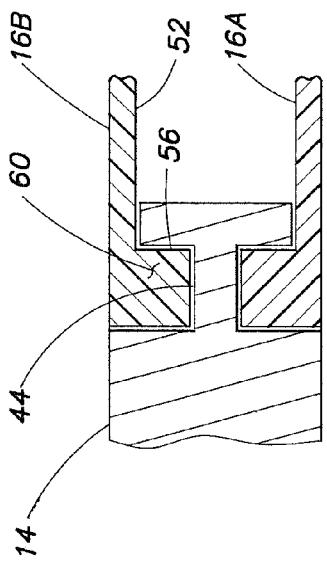
FIG. 9 is a cross-sectional partial view of a composite panel and shelf mating geometry.

In some embodiments, the edge 56 of the composite panel 16 and the shelf 44 form a mating geometry (e.g., male and female) that enhances the integrity of the joint between the panel 16 and the body 14. FIG. 9 illustrates an example of a mating geometry, wherein a feature 60 extends out from the inner surface 52 of the composite panel 16 contiguous with the edge 56 of the panel 16. The feature 60 is received within a shelf 44 disposed in the body 14, which shelf 44 has a geometry that mates with that of the feature 60. The mating geometry shown in FIG. 3 is an example of such geometry and the present invention is not limited to this example. Mating geometries can also be disposed between ribs 40 and the composite panels 16.

Figure 10:
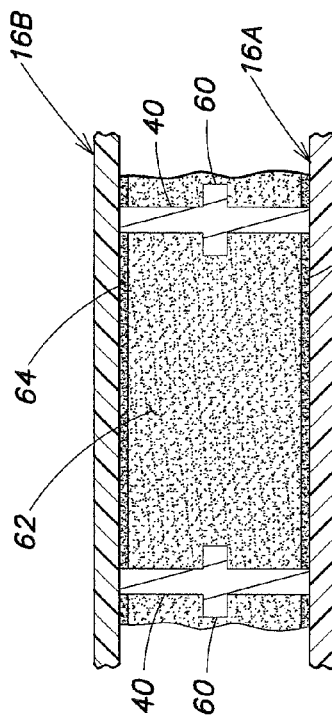
FIG. 10 is a cross-sectional diagrammatic view of an embodiment having cavities filled with a filler material.

In the embodiments in FIGS. 1-8, the cavities 34 disposed in the body 14 are hollow. In alternate embodiments, one or more of the cavities 34 disposed in the body 14 are at least partially filled or coated with a filler material 62. The filler material 62 may be any material that enhances the airfoil 10; e.g., by improving damping, or by providing additional bonding surface for a composite panel, etc. Suitable materials include, but are not limited to, polymer foams, metal based foams, etc. The filler material 62 can be impregnated with a material (e.g., resin, epoxy, etc.) to promote bonding between the filler material 62 and the composite panel 16. For example, FIG. 10 illustrates a cross-sectional partial view of a body 14 having a filler material 62 disposed within a cavity 34. A chemical agent 64 (e.g., a resin, and adhesive, etc.) is applied to the surface of the filler material 62 that creates a bond between the filler material 62 and the composite panel 16.

The composite panel(s) 16 is attached to the shelf 44 extending around the opening 38. The panel 16 can be attached to a single surface of the shelf 44 (e.g., the first mounting surface 46) or a plurality of surfaces within the shelf 44 (e.g., the first and second mounting surfaces, 46, 48). In FIGS. 2-6, the composite panels 16 are attached to both the shelves 44 and one or both of the spar 36, or ribs 40 extending out from the spar. The composite panel 16 can be attached to the body 14 (shelf 44, spar 36, ribs 40, etc.) through chemical bonding (e.g., an adhesive), or by mechanical fastener, or some combination thereof.

During operation of the airfoil 10, loads (transient or constant) applied to the airfoil 10 are borne by both the body 14 and the composite panel. Each of the body 14 and the composite panel 16 accept loads from, and transfer loads to, the other. Loads are transferred through the contact points between the composite panel and the body 14; e.g., through the first and second mounting surfaces 46, 48 of the shelf 44 and through the mounting surfaces 42 disposed at the distal end of the ribs 40. Hence, the composite panel 16 is a load bearing structure operable to transfer loads to the body 14 and receive loads from the body 14.

The present fan blade may be manufactured according to a variety of methodologies. As an example, the present invention airfoil 10 can start out as a pre-manufactured solid or hollow fan blade blank (e.g., made from light weight metal(s) such as, but not limited to, titanium, aluminum, magnesium, and/or alloys thereof). The airfoil blank is processed (e.g., machining, metallurgical treatments, etc.) to create the form of the body 14 to be used within the hybrid airfoil 10. The composite panel(s) 16 is fabricated to fit within the shelf 44 and close the opening 38 disposed in the body 14. The composite panel 16 is attached to the body 14. In some embodiments, the composite panel 16 is finished machined or otherwise blended to produce the aerodynamic shape of the body 14.

In an alternative embodiment, the panel 16 is composed of a lightweight metal that may be the same material or a different material from that of the body 14; e.g., aluminum panels may be attached to an aluminum airfoil, or titanium panels may be attached to an aluminum airfoil, etc. Like the composite panel, the metallic panel 16 has mechanical properties that accommodate the load expected during operation of the airfoil 10, and is shaped to close the opening 38 disposed in the side of the body 14 and to assume the aerodynamic shape of the airfoil side 26, 28 to which it is attached. Metallic panels may be attached by welding or other process along the periphery of the opening 38 and to ribs 40 disposed within the body 14. The metallic panel provides the same function as the composite panel; e.g., loads (transient or constant) applied to the airfoil 10 are borne by both the body 14 and the metallic panel. Each of the body 14 and the metallic panel 16 accept loads from, and transfer loads to, the other. Loads are transferred through the contact points between the metallic panel and the body 14; e.g., through the first and second mounting surfaces 46, 48 of the shelf 44 and through the mounting surfaces 42 disposed at the distal end of the ribs 40. The metallic panel 16 is, therefore, a load bearing structure operable to transfer loads to the body 14 and receive loads from the body 14.

While various embodiments of the present invention have been disclosed, it will be apparent to those of ordinary skill in the art that many more embodiments and implementations are possible within the scope of the method. Accordingly, the method is not to be restricted except in light of the attached claims and their equivalents.

What is claimed is:

1. An airfoil for a gas turbine engine, comprising:
    a body extending between a first side and a second side, and comprising a plurality of cavities extending from the first side toward the second side, a rib disposed between adjacent cavities, and a shelf extending around an opening in the first side foamed by the cavities and comprising a shelf mounting surface, wherein the rib comprises a rib mounting surface disposed at a distal end thereof, and wherein the body is formed from a metallic material; and
    a panel attached to the shelf mounting surface and the rib mounting surface, wherein the panel encloses the opening, and comprises a load bearing structure operable to transfer loads to the body and receive loads from the body.

2. The airfoil of claim 1, wherein the airfoil is a fan blade.

3. The airfoil of claim 1, wherein the metallic material comprises aluminum.

4. The airfoil of claim 3, wherein the airfoil is a fan blade.

5. The airfoil of claim 1, wherein the metallic material comprises at least one of titanium and magnesium.

6. The airfoil of claim 5, wherein the panel is formed from a second metallic material.

7. The airfoil of claim 6, wherein the airfoil is a fan blade.

8. The airfoil of claim 6, wherein the second metallic material comprises aluminum 9. The airfoil of claim 6, wherein the second metallic material comprises titanium.

10. The airfoil of claim 6, wherein:
    one or more of the cavities extend through the body between the first side and the second side, and form a second opening in the second side;
    the body further comprises a second shelf extending around the second opening; and
    a second panel is attached to a shelf mounting surface of the second shelf, which second panel encloses the second opening, and comprises a load bearing structure operable to transfer loads to the body and receive loads from the body.

11. The airfoil of claim 10, wherein the second panel is formed from the second metallic material, which comprises at least one of aluminum and titanium.

12. The airfoil of claim 6, further comprising:
    one or more second cavities that form a second opening in the second side;
    a second shelf disposed around the second opening, and comprising a second shelf mounting surface; and
    a second metallic panel attached to the second shelf mounting surface, which second metallic panel encloses the second opening, and comprises a load bearing structure operable to transfer loads to the body and receive loads from the body.

13. The airfoil of claim 12, wherein the airfoil is a fan blade.

14. The airfoil of claim 12, wherein adjacent second cavities are separated from one another by a second rib.

15. The airfoil of claim 12, wherein the second panel is formed from the second metallic material, which comprises at least one of aluminum and titanium.

16. The airfoil of claim 1, wherein a filler material is disposed within at least one of the cavities.

17. The airfoil of claim 1, wherein the panel is formed from a polymer matrix and at least one of woven, braided and laminated fibers.

18. An airfoil for a gas turbine engine, comprising:
    a body extending between a first airfoil side and a second airfoil side, and comprising a spar extending in a first direction between an airfoil base and an airfoil tip, and extending in a second direction between an airfoil leading edge and an airfoil trailing edge, which spar forms a first opening in the first airfoil side and a first shelf extending around the first opening, and a second opening in the second airfoil side and a second shelf extending around the second opening, wherein the body is formed from a metallic material;

a first panel attached to the first shelf, wherein the first panel encloses the first opening, and comprises a load bearing structure operable to transfer loads to the body and receive loads from the body; and a second panel attached to the second shelf, wherein the second panel encloses the second opening, and comprises a load bearing structure operable to transfer loads to the body and receive loads from the body.

19. The airfoil of claim 18, wherein the airfoil is a fan blade.

20. The airfoil of claim 18, wherein the metallic material comprises at least one of aluminum, titanium and magnesium.

21. The airfoil of claim 20, wherein the airfoil is a fan blade.

22. The airfoil of claim 18, wherein at least one of the first panel and the second panel is formed from a second metallic material that comprises at least one of aluminum and titanium.

23. The airfoil of claim 18, wherein the spar extends between a first spar side and a second spar side, and comprises:

a plurality of first ribs extending outwardly from the first spar side, each first rib comprising a distal end attached to an inner surface of the first panel; and a plurality of second ribs extending outwardly from the second spar side, each second rib comprising a distal end attached to an inner surface of the second panel.

24. The airfoil of claim 23, wherein the airfoil is a fan blade.

25. The airfoil of claim 23, wherein the first panel further comprises one or more features extending from its inner surface to the spar.

26. The airfoil of claim 23, wherein the first panel further comprises one or more features extending from its inner surface, through the spar, to the second panel.

* * * * *